March 9, 1965  G. W. SMITH  3,172,230
POWER DRIVEN MINIATURE AIRCRAFT
Original Filed Nov. 23, 1959  3 Sheets-Sheet 1
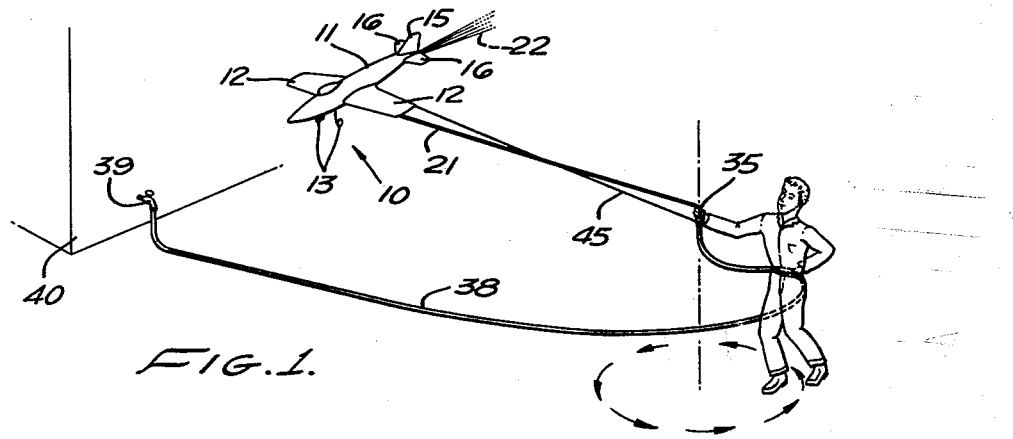
FIG. 1.
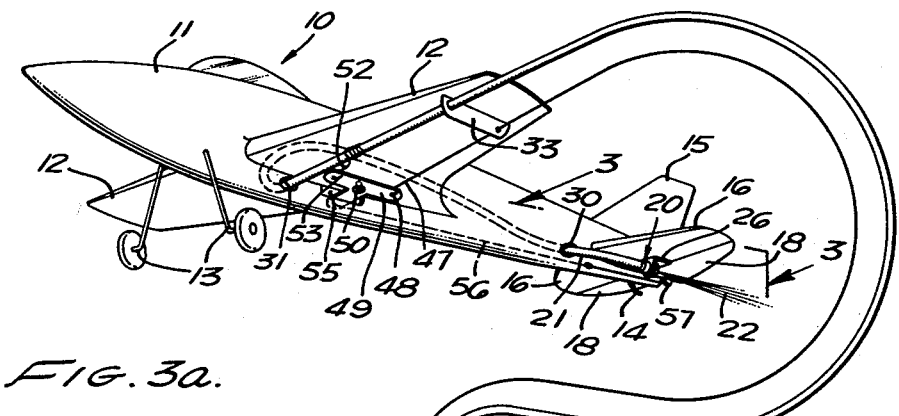
FIG. 2.
FIG. 3a.
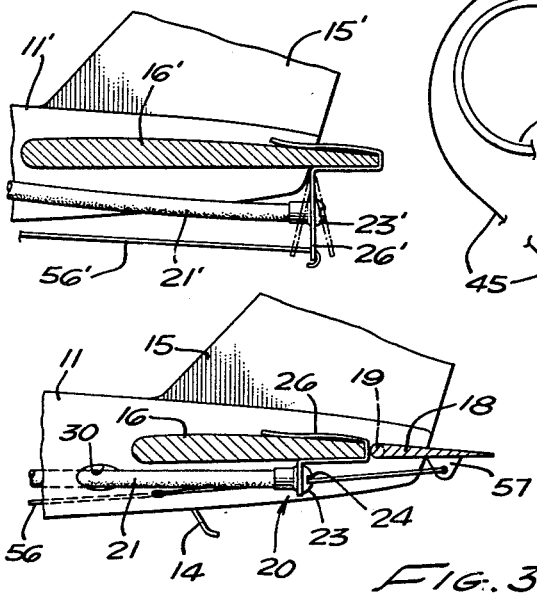
FIG. 3.
INVENTOR.
GENE W. SMITH
BY 
ATTORNEY

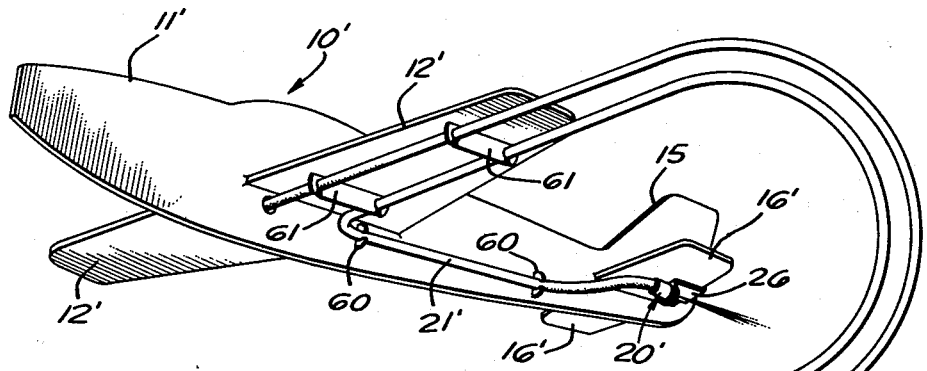
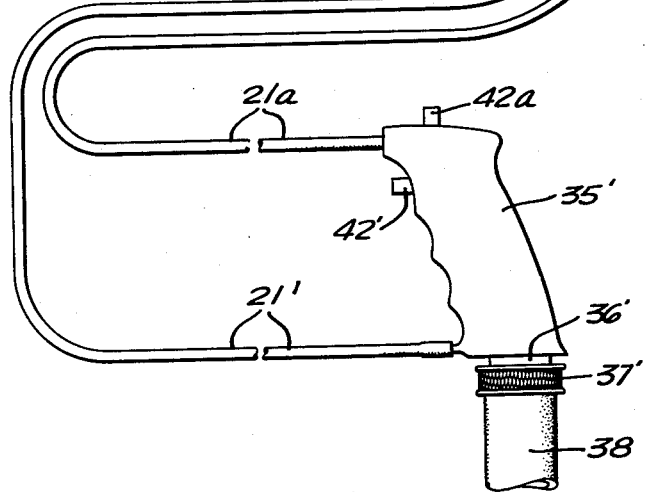
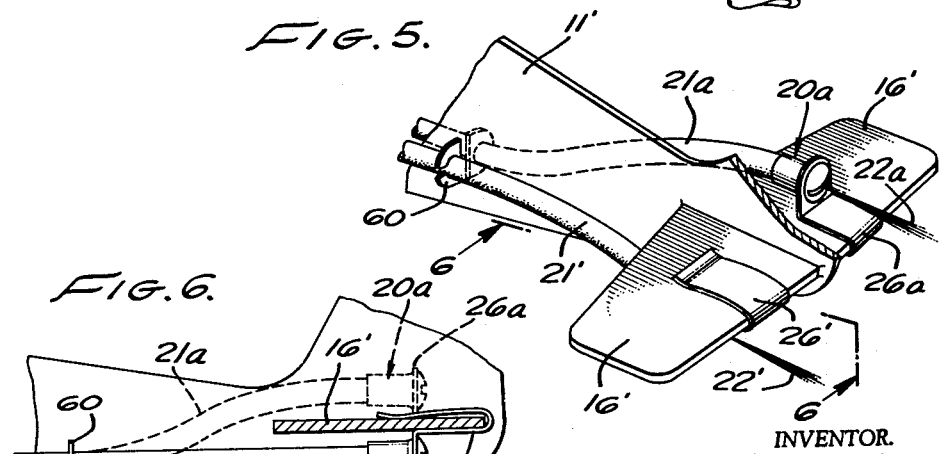

March 9, 1965 G. W. SMITH 3,172,230
POWER DRIVEN MINIATURE AIRCRAFT
Original Filed Nov. 23, 1959 3 Sheets-Sheet 3

INVENTOR.
GENE W. SMITH
BY
ATTORNEY

United States Patent Office 3,172,230
Patented Mar. 9, 1965

3,172,230
POWER DRIVEN MINIATURE AIRCRAFT
Gene W. Smith, 5008 La Canada Blvd., La Canada, Calif.
Original application Nov. 23, 1959, Ser. No. 854,849, now Patent No. 3,093,927, dated June 18, 1963. Divided and this application Feb. 13, 1963, Ser. No. 258,591
19 Claims. (Cl. 46—75)

This is a division of application Serial No. 854,849, filed November 23, 1959, now Patent No. 3,093,927.

This invention relates to toys and more particularly to toy size vehicles adapted to be propelled by reaction motor means forming part of the vehicle and supplied with pressurized fluid from a remote source, and which vehicle is readily controllable by an operator from a control station remote from the vehicle. For purpose of illustration the invention will be disclosed as embodied in representative aircraft vehicles.

Miniature aircraft of a wide variety of designs and constructions have been proposed heretofore employing self-contained power means capable of sustaining the craft in flight. One such construction employs stored resilient energy releasable over a period of time to rotate a propeller or the like means for propulsion of the craft. The rubber bands, coil springs, etc., utilized as the energy storing means have very limited energy storing capabilities. A more satisfactory type of power plant developed in recent years comprises an internal combustion engine having a crankshaft connected directly to a propeller. Control of the aileron or other flight sensitive surfaces of engine-powered craft through remote control by an operator on the ground is effected in various ways and commonly by a pair of parallel control wires extending between the craft and a connecting link manipulatable by the operator. Many different designs of engine driven miniature aircraft have been proposed and flown.

Nevertheless, all are subject to numerous disadvantages sought to be avoided by the present invention. The resilient spring type of power plant is subject to so many shortcomings owing to its limited power output and particularly its short flight span, that craft depending on spring motors hold the operator's interest but briefly. Internal combustion engine driven aircraft can be flown for extended periods at a wide range of speeds and can be maneuvered through both simple and complex flight patterns rather successfully. However, the cost of the aircraft, the power plant, and the required auxiliary equipment is so high as to be beyond the resources of many youngsters. The technical know-how required to operate these devices and the very substantial hazards unavoidably involved limit the use of such craft to the hands of cautious and skilled operators and normally require the presence of an adult. A particularly serious disadvantage is the high operating noise level of the engine. In fact, this obstacle is so serious that many populated communities prohibit the flight of such craft altogether or restrict flights to designated areas and times. A further disadvantage of previously proposed powered aircraft is that they are dependent on propellers for propulsion whereas modern flight technology relies heavily on jet propulsion.

In view of the growing emphasis on jet engines for aircraft power plants, feeble attempts have been made to propel toy aircraft using a simple reaction motor, but with small success. For example, it has been proposed to use the body of the airframe to contain pressurized air exhausting rearwardly through a nozzle and effective to propel the craft for the brief interval required to consume the limited air supply. To avoid these short duration flight capabilities it has been proposed to suspend the aircraft from a flexible tube through which air under pressure is supplied to drive a propeller by the aid of an impulse turbine.

In the light of the many shortcomings and serious limitations of prior power driven aircraft of the miniature or toy type, it is the purpose of the present invention to provide an air-sustained aircraft powered by one or more reaction type motors and capable of continuous free flight within the vicinity of an operator. Aircraft of the widest variety of designs, types and constructions can be flown utilizing the principles of the present invention including fixed and movable airfoil types as well as many others. Not only is the aircraft of this invention substantially noiseless in flight but it is capable of being flown without substantial hazard to property or the person by children of wide age range, but the substantially endless design and operating possibilities of which are so great as to interest and provide a continuing challenge to both children and adults. Although pressurized gas or liquid can be employed as the continuous energy source, a particularly inexpensive and universally-available supply is provided by the pressurized water supply commonly available in most buildings and dwellings. This or other pressurized fluid is conducted to the aircraft through flexible lightweight tubing of any suitable length and is utilized to energize a simple reaction motor on the plane. In a typical form, such a motor may comprise a discharge nozzle located in the end of a supply tube and either fixedly or movably mounted on the craft. The nozzle may be used singly or in multiple, and may be shifted to change the flight path under control from the ground at the operator's election to maneuver the plane through an intricate flight path. If desired, the reaction motor may be mounted in the tips of helicopter-type rotating airfoils to the end that the helicopter may be flown by jet-propelled airfoils. Maneuvering of the helicopter is achieved as by controlling the relative speeds of rotation of the airfoils and in other ways consistent with the principles of this invention.

Control of types of aircraft employing this invention is achieved without undue complexity and by means which will be disclosed herein or in related applications for Letters Patent now in process of preparation. The speed of flight and maneuver of the craft may be provided in numerous ways including the control of the rate of fluid flow, control of fluid pressure, and movement of plane components through forces delivered selectively through parallel multiple tubes or control links extending between the craft and the ground-based operating station.

Another feature of the invention is the provision at the ground station of a hand-held control member to which the pressurized fluid supply hose is connected. This control member includes finger operated members actuatable by the fingers of one hand to effect all necessary movements required for the manuever of the craft, including its take-off and landing.

Accordingly, it is a primary object of the invention to provide a toy or miniature airplane adapted to be flown in free flight in the vicinity of a ground control station and utilizing energy continuously supplied to the plane from the ground station.

Another object of the invention is the provision of a miniature aircraft designed to be flown and maneuvered at the will of the ground-stationed operator utilizing pressurized fluid to provide the propelling energy.

Another object of the invention is the provision of an inexpensive miniature aircraft powered by a reaction type motor and having common connections with a ground-stationed operator for supplying energizing fluid to the craft and for controlling its flight pattern at the will of the operator.

Another object of the invention is the provision of a toy aircraft having a plurality of reaction type propulsion motors continuously supplied with pressurized fluid from a source on the ground and embodying control means so simple and so easily manipulated as to be readily mastered by children and yet which are sufficiently versatile as to challenge and hold the interest of older children and adults alike.

Another object of the invention is the provision of a self-powered miniature aircraft having a plurality of reaction motors independently supplied with pressurized fluid and controllable by an operator on the ground to maneuver the craft at will including take-off and landing of the craft under power.

Another object of the invention is the provision of the reaction type propulsion and flight control system for miniature aircraft so designed as to be readily installable on existing craft thereby to convert non-power driven miniature craft to powered flight operation.

Another object of the invention is the provision of a reaction type propulsion system for aircraft adapted to fly heavier-than-air craft of all known types, including fixed and moving wing types.

These and other more specific objects will appear upon reading the following specification and claims and upon considering in connection therewith the attached drawings to which they relate.

Referring now to the drawings in which preferred embodiments of the invention are illustrated:

FIGURE 1 is a view showing one preferred embodiment of the invention in flight;

FIGURE 2 is an enlarged perspective view of the FIGURE 1 embodiment as it appears to the ground-stationed operator in flight;

FIGURE 3 is an enlarged fragmentary sectional view adjacent the reaction motor of the FIGURE 1 embodiment and showing the relationship of this motor to a control aileron;

FIGURE 3a is a view similar to FIGURE 3 but showing an alternate mode of controlling the flight path of the aircraft;

FIGURE 4 is a perspective view similar to FIGURE 2 of a second embodiment of the invention propelled by a pair of motors;

FIGURE 5 is an enlarged fragmentary perspective view of the tail assembly of FIGURE 4 showing a typical one of various dispositions of the reaction motors relative to the tail structure;

FIGURE 6 is a fragmentary enlarged sectional view taken along line 6—6 on FIGURE 5;

Figure 7:
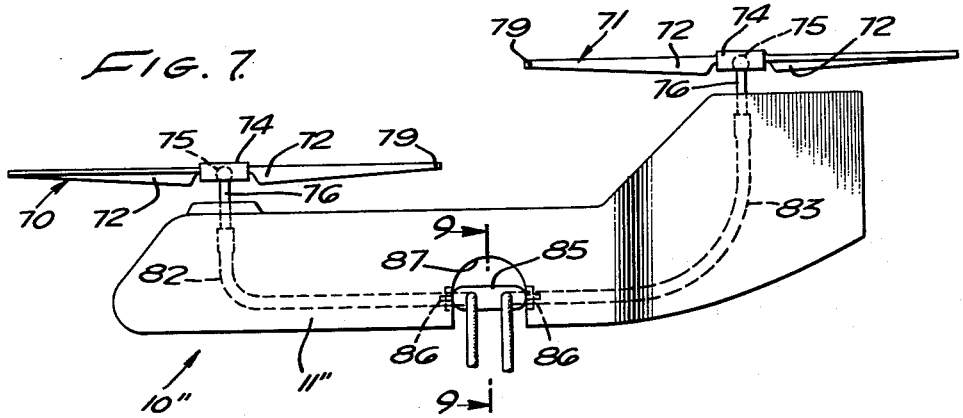
FIGURE 7 is a side elevational view of a helicopter type aircraft employing principles of this invention.

Referring first to FIGURES 1 to 3, there is shown one preferred embodiment of the invention comprising a miniature aircraft designated generally 10 having an aerodynamically contoured airframe including an elongated tear-shaped fuselage 11 having fixed to its opposite sides wings or airfoils 12, 12. To facilitate landing and take-off the forward end of fuselage 11 is provided with a suitable wheeled carriage 13 while the rear may be supported suitably as by rearwardly projecting skid 14. The tail structure includes the usual vertical fin 15 and oppositely projecting horizontal fins 16, the latter preferably each including an aileron 18 pivoted to fuselage 11 at 19 in any suitable manner for concurrent movement. In normal level flight it will be understood ailerons 18 lie in the same general plane as tail fins 16, 16 and form extensions of tail fins 16, 16. Upward or downward pivotal movement of ailerons 18 about the aligned horizontal axis of pivot 19 is effective in known manner to cause the nose of the plane to rise or dive depending upon the direction of movement of the ailerons from their normal level flight position.

The flight control and power system for aircraft 10 comprises a reaction motor 20 attached to the discharge end of a small-bore, lightweight, flexible, plastic tube 21. In its simplest form, motor 20 comprises simply a fitting having a small bore axial orifice for jetting the pressurized fluid supplied thereto rearwardly of the aircraft in a fine high velocity jet 22. As here shown, the semi-spherical rear end 23 of the motor is slotted transversely as is indicated at 24 and the small bore orifice opens through the bottom portion of this slot. It is pointed out that slot 24 is not essential to the operation of the motor and may be omitted if desired without detrimental effect, the purpose of slot 24 being to facilitate assembly of the motor, the constructional details of which are not essential to an understanding of this invention as herein broadly claimed. Secured to the midportion of motor 20 is a U-shaped mounting clip 26 of suitable resilient strip material of metal, plastic or the like. Mounting clip 26 is so contoured and proportioned as to have a snug frictional fit over the rear edge of tail fin 16 thereby avoiding the need for assembly fasteners. Desirably, clip 26 is press-assembled over the rear edge of tail fin 16 and shifted as necessary into its desired operating position closely adjacent fuselage 11 with the axis of the jet orifice close and parallel to the longitudinal axis of the craft.

Tube 21 for supplying the pressurized fluid may be secured along the body of the craft 10 in any suitable manner without need for fasteners, as by threading the tube through elongated openings 30, 31 in the fuselage and then along one wing. Additional support in the form of a flange 33 mounted near the tip of one wing constitutes the only other necessary connection of the tube with respect to aircraft 10.

It will be understood that the lightweight flexible tube 21 is of sufficient length to reach to a remote manned operating station, a distance varying widely depending on the size of the aircraft, its power requirements, the pressure and type of fluid used to power the motor, the available maneuver space, and the like factors. As will be appreciated, the load lifting capabilities of the airframe is an important factor since the weight and drag of the fluid supply tube limit the length of the tube and of the flying radius. A typical small model aircraft may be flown and readily maneuvered using a tube from 15, 40, 50 or more feet in length. It will be understood that these tube lengths are mentioned by way of example of tube lengths found highly satisfactory in flying a wide range of conventional small model planes using water supplied from municipal water supplies as the energy source.

Water from municipal water supplies is highly effective and practical but it is to be understood that other sources of pressurized fluid may be used including both gases and liquids, the principal deciding factors usually being those of cost and availability.

The ground station or control end of tube 21 makes use of a hollow handgrip 35 molded or cast from suitable material and having a freely rotatable threaded nipple 36 at its lower end to which the threaded sleeve 37 of a garden hose coupling may be readily secured. Any suitable flexible garden hose 38 serves to connect handgrip 35 to a source of pressurized fluid, such as the service spigot 39 usually found on the outer wall of a dwelling indicated at 40. Preferably, the pressure and volume of the water permitted to flow from hose 38 through handgrip 35 and into tube 21 is controlled by suitable regulating means housed within handgrip 35 and controlled by a movably supported trigger or button 42 projecting from one edge of handgrip 35. It will be understood that normally the fluid supply from the handgrip to tube 21 is automatically closed by suitable means such as a spring biased valve readily adjusted to any desired degree of opening by pressing button 42 inwardly.

Supplementing and cooperating with tube 21 and handgrip 35 in controlling the flight of the aircraft, there is provided a thin lightweight non-stretching tension link 45 having its lower end anchored to handgrip 35 as by pin 46. Tension link 45 may comprise a nylon cord, a very slender high strength wire, or the like having substantially the same length between the plane and grip 35 as the corresponding portion of tube 21. End 47 of link 45 is connected at 48 to a T-shaped rigid bellcrank member 49 pivoted to the underside of wing 12 close to the fuselage, as by headed pin 50. The opposite end of the head portion of member 49 is adjustably connected to tube 21 in any suitable manner as by a length of piano wire 52 having one end hooked to member 49 as is indicated at 53 and its coiled end snugly embracing tube 21 with sufficient pressure to retain any selected adjusted position therealong while being forcibly shiftable to a different position if so desired. The coiled portion of link 52 may be cemented to the tube although this is not found necessary and is desirably omitted since the snug frictional fit permits of adjustment along the tube as is sometimes necessary for the most effective use of link 52 in controlling the operation of the plane. The stem portion of member 49 extends through an elongated opening 55 in the fuselage and has a relatively rigid and non-bending connecting link 56 extending therefrom through an opening in the fuselage to a tab 57 secured to the underside of aileron 18.

From the foregoing it will be readily understood that if link 45 is of substantially the same length as the corresponding portion of tube 21, the tensioning of either link 45 or tube 21 while relaxing the tension on the other of these members will result in the pivotal movement of member 49 and of ailerons 18 about the latter's pivot 19. As will be evident from the foregoing, tube 21 serves important dual functions, namely, the supply of pressurized fluid to motor 20 as well as one of a pair of tension links through which control forces are transmitted between the operator and control means on the aircraft.

To fly craft 10, it is merely necessary to connect a source of pressurized fluid to the rotatable nipple 36 carried by handgrip 35. Standing to one side of plane 10 a distance approximating the length of control links 21 and 45, the operator grasps handgrip 35 in his right hand using the index finger to depress valve control button 42 and supply water under pressure to motor 20 by way of tube 21. The static energy of the fluid supplied to motor 20 is converted to kinetic energy as the water flows through the rearwardly facing orifice of the motor and issues therefrom as a high velocity jet 22 which is effective to propel the craft forward on its carriage 31 and skid 14. As the craft reaches flying speed it lifts into the air. Owing to the tethering action of tube 21 and link 45, the craft flies in a circle about an axis passing through the handgrip as the operator steps backward in a circle indicated in broken line in FIGURE 1. So long as handgrip 35 is held in a manner to maintain ailerons in the plane of tail fins 16, the craft travels in level flight. Inclination of handgrip 35 relative to its longitudinal axis in a manner to unbalance the tension forces acting along links 21, 45, elevates or depresses ailerons 18 causing the plane to rise or dip depending upon the direction of movement of the handgrip.

Change of speed is easily and simultaneously effected if desired by varying the position of the control button 42. Flight patterns of complex and endlessly variegated pattern may be flown by appropriate manipulation of handgrip 35 in accordance with the foregoing and flight control techniques well known to those experienced in the control of powered toy aircraft. Landing of the craft from a period of flight is initiated by decreasing the flow of pressurized fluid to motor 20 thereby allowing the plane to slow down and glide to a landing.

In slight modification of the control means illustrated in FIGURE 3a, the spring clip mounting 26' for jet motor 23' is pressed over the rear edge of stationary tail 16', and control link 56' is attached to the lower end of an extension on clip 26'. Normally, this extension occupies the dotted line position inclined toward the right wherein the jet stream issuing from motor 23' is inclined upwardly causing the nose of the plane to rise. In the full line position of motor 23', the axis of the jet is parallel to the axis of the craft, and the latter flies in a level position. If control link 56' is pulled harder, clip 26' is flexed to the left causing the plane to nose downwardly. It will therefore be appreciated that the flight path is readily controlled merely by shifting the axis of the jet motor relative to some other part of the craft such as the longitudinal axis of the craft.

A second preferred embodiment illustrated in FIGURES 4 to 6 is generally similar to that just described, it being understood that the same or similar parts to those pesent in FIGURES 1 to 4 are identified by the same reference characters distinguished by the addition of a prime. As will be recognized from the drawings, the airframe including fuselage 11' and fixed wings 12' is of very simple construction, these being formed from lightweight sheet material secured together in any suitable manner. Another principal difference resides in the fact that the plane is propelled by a pair of identical reaction motors 20' and 20a symmetrically secured one to each of the horizontal tail fins 16' in the non-symmetrical manner best illustrated in FIGURE 5. For example, motor 20a is clipped by a friction spring clip 26a to the upper surface of tail fin 16', whereas motor 20' is clipped by a similar mounting clip 26' to the underside of the other tail fin 16'. Note that the axis of each motor is approximately the same distance from the longitudinal center line of the fuselage.

It is pointed out and emphasized that motors 20' and 20a may be mounted on the plane in a great variety of arrangements, each having a different effect on the flight of the craft. For example, both motors may be mounted on the upper surfaces of the tail fin, or both on the lower surfaces, or in the alternate position to that illustrated in FIGURE 5. Different locations of the motors will impart different flight characteristics of the plane in flight. It will also be recognized that the axes of the two motors can be spaced unequally from the vertical tail fin if desired to produce a still different effect on the flight path taken by the plane.

The plastic tubes 21', 21a supplying pressurized fluid to the respective motors may be secured in place along the fuselage and wings of the plane in any suitable manner, as by the clips indicated at 60 and 61. As here shown, lower ends of tubes 21', 21a are connected to the opposite ends of hollow handgrip 35'. It will be understood that handgrip 35' includes independent controls for regulating the pressure and flow rate of the fluid passing to tubes 21', 21a, spring pressed control button 42' controlling the flow of fluid to tube 21' and a similar thumb pressed control button 42a located at the top of the handgrip being similarly effective to control the flow of fluid to tube 21a.

The construction shown in FIGURES 4 to 6 is flown in a manner closely related to that described above in connection with the first embodiment. However, handgrip 35' is not effective to control the flight path by mere tilting; instead climb and diving movements of the plane are controlled by the differential regulation of buttons 42' and 42a, it being noted from FIGURES 5 and 6 that, owing to the disposition of motors 20' and 20a above and below the longitudinal axis of the craft, the craft has a greater impetus either up or down depending upon which motor receives the greater quantity of fluid or fluid at the higher pressure. Accordingly, the operator has but to press one button more than the other to cause the plane to rise or to dive, the rate of change in elevation being related to the mentioned differential adjustment of buttons 42' and 42a.

Figure 8:
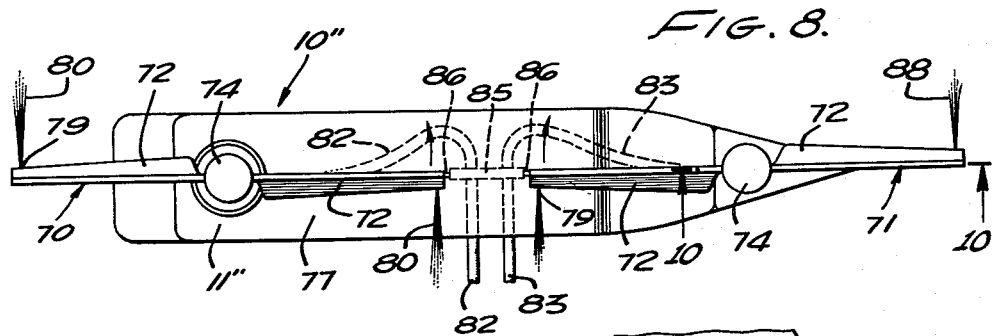
FIGURE 8 is a top plan view of FIGURE 7.
Figure 9:
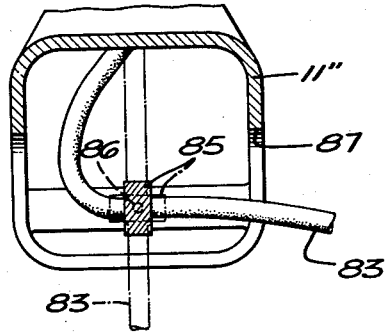
FIGURE 9 is a fragmentary sectional view on an enlarged scale taken along line 9—9 on FIGURE 7.
Figure 10:
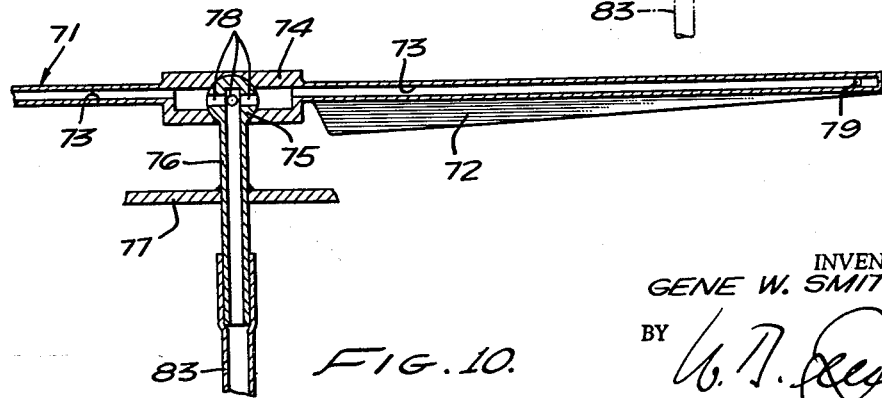
FIGURE 10 is an enlarged fragmentary sectional view taken along line 10—10 on FIGURE 8.

Referring now to FIGURES 7 to 10, there is shown a third embodiment designated generally 10" and readily recognized as being a twin rotor helicopter having an elongated fuselage 11" rotatably supporting at its opposite ends and in generally horizontal planes a pair of rotating airfoils 70, 71. As herein shown, airfoils 70, 71 are of identical construction and are provided with diametrically disposed aerodynamically contoured blades 72 having fluid flow passages 73 extending to the tips thereof. Passages 73 open into a hollow hub 74 having a ball and socket fluid-tight joint with a ball 75 formed at the upper end of a tube 76. This tube is fixed to the top surface of top wall 77 of the hollow fuselage 11". Ball 75 has fluid discharge passages 78 opening into hub 74 and distributing passages 73 in blades 72. Opening laterally through the trailing edge of each blade tip is an orifice 79 which constitutes the outlet port of the reaction motors formed in the tips of airfoils 70, 71 and serving to propel the same in opposite directions about bearing ball 75.

The means for supplying pressurized fluid to the lower ends of tubes 76 comprises plastic tubes 82, 83 of generally similar length and extending to the ground control station and connected to a source of pressurized fluid through a control device as device 35' illustrated in FIGURE 4. Tubes 82, 83 have a pivoting support midway between air foils 70, 71 formed by a rigid member 85 having trunnions 86 projecting from its opposite ends and journaled in the opposite sides of a doorway 87 formed centrally in one side wall of fuselage 11" in the manner best illustrated in FIGURES 7 and 9. Each of the tubes 82, 83 passes through an opening formed near the opposite ends of member 85, it being understood that each of the tubes has a snug friction fit with the opening in member 85. If desired, suitable clamp means or adhesive may be employed to prevent movement of the tubes axially of the supporting openings therefor in member 85. Desirably, each of the tubes has an identical length between the outer side of member 85 and the point of connection with the opposite ends of handgrip 35'.

During initial take-off the fuselage of helicopter 10" may be held horizontally in the hand as the other hand grasps handgrip 35' and depresses buttons 42', 42a to admit pressurized fluid through tubes 82, 83 to the reaction motors located in the tips of rotors 70, 71. If adequate and substantially equal quantities of fluid are admitted to each rotor, the rotors will lift the craft vertically to a desired height. Thereafter, movement in a desired direction may be initiated by admitting a greater quantity of the fluid to one of the rotors thereby operating it at a higher speed than the other. This differential operation of the rotors will cause the fuselage to tip and to move in a desired direction in accordance with well known operating principles applicable to helicopters. Movement in the opposite direction is accomplished by decreasing the flow to one rotor and increasing the flow to the other, it being apparent that the rate of travel in a desired direction is governed by the differential rates of rotation and by the differential supply of fluid to the reaction motors associated with each airfoil.

Although the embodiments hereinabove disclosed are illustrative of the principles of the invention, it is pointed out and emphasized that these principles can be incorporated in remote controlled unmanned miniature vehicles generally including land, water and air craft. For this reason it is to be understood that the presence of the term aircraft in the annexed claims is not used as a word of limitation unless a claim includes other limitations properly limiting the defined structure to one suitable for air-sustained flight.

While the particular power driven miniature aircraft herein shown and disclosed in detail is fully capable of attaining the objects and providing the advantages hereinbefore stated, it is to be understood that it is merely illustrative of the presently preferred embodiments of the invention and that no limitations are intended to the details of construction or design herein shown other than as defined in the appended claims.

I claim:

1. In combination, a toy aircraft adapted to be flown in air-sustained flight, said aircraft having a main body and a plurality of air foil means cooperating to support the aircraft in flight, a plurality of fluid-driven jet-type reaction motors carried by said aircraft free of internal moving components, flexible tubular means extending from a ground-based flight control station connected to each of said reaction motors for supplying separate energizing pressurized fluid thereto to propel said aircraft and maintain the same in flight by power provided by said reaction motors as pressurized fluid discharges therefrom into the ambient air, and regulatable means at said flight control station for separately regulating the pressurized fluid supplied to each of said motors in a manner to change the flight characteristics of said aircraft from one predetermined pattern to another.

2. A toy aircraft as defined in claim 1 characterized in that said regulatable means at said flight control station includes at least one manually adjustable valve for regulating the flow of pressurized fluid to at least one of said reaction motors and being operable to vary the effective power output of one of said reaction motors.

3. A toy aircraft as defined in claim 1 characterized in that said regulatable means at said flight control station includes a separate adjustable valve individually operable to control the flow of pressurized fluid to an associated one of said reaction motors to vary the flight path and operating characteristics of said aircraft in flight.

4. A toy aircraft as defined in claim 3 characterized in that said regulatable means at said flight control station includes a main body sized to be grasped and carried in the palm of an operator's hand, said flexible tubular means being attached to and in communication with the interior of said main body, and said separate adjustable valves being mounted in said main body and having individual actuating means positioned to be adjusted by the operator's thumb and fingers of the hand grasping said main body, and said main body having means for swivelly connecting the same to a source of pressurized fluid.

5. A toy aircraft as defined in claim 3 characterized in that said flexible tubular means is attached to the fuselage of said aircraft at a point spaced generally centrally between the opposite ends thereof.

6. A toy aircraft as defined in claim 5 characterized in that the attachment of said flexible tubular means to said fuselage includes a swivelling connection having a pivot axis extending parallel to the longitudinal axis of said aircraft.

7. A toy aircraft adapted to be flown in air-sustained flight under the power furnished by a plurality of fluid jets discharging into the ambient air from spaced apart support points on said aircraft, said aircraft having an aerodynamically designed body including laterally projecting wings and tail fins at the rear thereof, a pair of jet motors spaced laterally to either side of the longitudinal axis of said aircraft each having a fluid outlet orifice discharging rearwardly and generally parallel to one another, and flexible conduit means connected to each of said jet motors and extending from said aircraft to a ground-based control station and a source of pressurized fluid, and means at said control station operable to vary the flow of pressurized fluid to said jet motors differentially thereby to vary the flight characteristics of said aircraft from one predetermined pattern to another.

8. A toy aircraft as defined in claim 7 characterized in that said jet motors include means for adjusting the positions thereof laterally of the longitudinal axis of said aircraft thereby to vary the effectiveness of said jet motors to vary the flight path of the aircraft.

9. A toy aircraft adapted to be flown in free air-sustained flight from power supplied by a plurality of jet motors mounted thereon and energized by jets of pressurized fluid discharging therefrom into the ambient air, said aircraft having an airframe rotatably supporting at least one set of helicopter type airfoils, jet motor means mounted in the outer end of said airfoils having a discharge orifice discharging in the plane of rotation thereof and effective to maintain said aircraft in air-sustained flight by the rotation of said set of airfoils, other jet motor means mounted on said airframe independently of said one set of airfoils and cooperating with said jet motor-driven airfoils in sustaining said aircraft in free flight, and means including flexible hose means connected to supply pressurized fluid to each of said jet motors from a supply source located on the ground.

10. A toy aircraft of the helicopter type aircraft capable of being flown in air-sustained flight utilizing pressurized fluid supplied thereto through flexible tube means in communication with a ground-based supply source, said aircraft having an elongated main frame provided with a pair of rotatable airfoils near the opposite ends thereof each provided with fluid jet motors operable to rotate said airfoils in opposite directions, said airfoils and the supporting hubs therefor including duct means for supplying fluid to said jet motors, and flexible tube means connected to the respective ones of said duct means and extending to a source of pressurized fluid on the ground and operable to supply independently regulatable quantities of pressurized fluid to each of said jet motors.

11. A toy helicopter aircraft as defined in claim 10 characterized in that said duct means includes passages formed lengthwise of said airfoils and stationary hub means supporting said airfoils on said aircraft.

12. A toy helicopter aircraft as defined in claim 11 characterized in that said rotatable airfoils are supported to rotate in planes spaced vertically from one another.

13. A toy helicopter aircraft as defined in claim 11 characterized in the provision of swivelling support means mounted for pivotal movement about an axis close to and parallel to the longitudinal axis of the aircraft and generally between said rotatable airfoils.

14. A power-driven free-flight toy aircraft adapted to be flown in air-sustained flight under the control of and in the vicinity of a ground-stationed operator, said aircraft having a plurality of independently operable reaction motors mounted thereon, flexible tube means connected to said reaction motors to supply energizing pressurized fluid thereto, said flexible tube means extending from said power-driven aircraft to a source of pressurized fluid on the ground, and means utilizing said flexible tube means from a control station on the ground to regulate and change the flight pattern of said aircraft by differentially varying the pressurized fluid supplied to said reaction motors.

15. An aircraft as defined in claim 14 characterized in that said fluid-conveying flexible tube means are connected at their lower ends to a hollow handgrip, adapted to be carried about in the operator's hand and valve controlled means mounted on said handgrip independently and selectively manipulatable by the operator while carrying said handgrip to vary the flow of pressurized fluid being supplied through each of said tubes thereby to vary the flight pattern of said aircraft.

16. An aircraft as defined in claim 14 characterized in that at least one of said reaction motor means is movably supported on said aircraft.

17. An aircraft as defined in claim 14 characterized in that at least one of said reaction motor means is rotatable about a bearing support therefor carried by said aircraft.

18. An aircraft as defined in claim 14 characterized in that each of said reaction motor means is rotatable about bearing means carried by said aircraft.

19. An aircraft as defined in claim 18 characterized in that said reaction motor means are mounted in the tips of and comprise part of rotating blade-like airfoils journaled on either side of the center of gravity of an airframe constituting the major body member of said aircraft, said bearing means including passage means for conducting pressurized fluid from said tubes into the interior of said airfoils to said reaction motor means at the tips thereof.

References Cited by the Examiner

UNITED STATES PATENTS

| | | | |
|---|---|---|---|
| 2,921,743 | 1/60 | Westover et al. | 46—77 X |
| 2,937,473 | 5/60 | Vlachos | 46—75 |
| 3,080,676 | 3/63 | Stanzel | 46—77 |

FOREIGN PATENTS 1,077,147  4/54  France.

RICHARD C. PINKHAM, *Primary Examiner.*